Feb. 22, 1938.  J. A. BOYER ET AL  2,109,246

DENSE NONMETALLIC BODIES

Filed July 28, 1936

INVENTOR.
John A. Boyer
Carl G. Rose
BY
ATTORNEY.

Patented Feb. 22, 1938

2,109,246

UNITED STATES PATENT OFFICE 2,109,246

DENSE NONMETALLIC BODIES

John A. Boyer and Carl G. Rose, Niagara Falls, N. Y., assignors, by mesne assignments, to The Carborundum Company, Niagara Falls, N. Y., a corporation of Delaware Application July 28, 1936, Serial No. 93,039

6 Claims. (Cl. 75—137)

This invention relates to dense bodies and shaped articles made from non-metallic mixes, and to their manufacture. The invention relates particularly to the forming of non-metallic articles under pressure from a mix which is plastic or partialy molten, but which contains a substantial proportion of unmelted material.

One of the objects of the invention is the production of non-metallic bodies in which the apparent density approaches the true specific gravity of the composition used. Another object is to provide a method of forming dense articles or compositions in which a difficultly fusible or infusible material is one of the principal ingredients.

There are many materials, such as silicon carbide, tungsten carbide and tantalum carbide, which possess extreme hardness, but which are very difficult to obtain in massive form or in the form of a solid shaped article without the introduction of softening ingredients such as metals. In the case of silicon carbide, even the addition of a considerable proportion of metal will not produce a dense article, for silicon carbide is insoluble in metals, and will not dissolve without decomposing into its elements silicon and carbon. There are also a number of high melting materials, such as fused alumina, which can be melted, but which cannot readily be cast into precision shapes free from internal cavities. In prior practice it has been customary to bond these materials, and only in the case of the heavy metal carbides, such as tungsten carbide, where the material will alloy with metal, have dense shaped articles been produced.

In accordance with the present invention, the difficultly fusible or infusible material is mixed with a non-metallic bonding agent or matrix-forming ingredient in which the higher melting material is soluble, and the composition proportioned so that upon heating, the mixture will become either plastic or partially molten without becoming completely fluid. Pressure is applied within the temperature range in which the mixture is plastic or "pasty", the article being molded to shape. In this manner, it is possible to obtain solid bodies containing high percentages of difficultly fusible or infusible materials without introducing metals or other softening ingredients into the mix.

The production of dense articles from granular or powdered silicon carbide has presented a particularly difficult problem, owing to the infusibility of silicon carbide and its insolubility in practically all molten materials which do not decompose it. When silicon carbide is heated to an extremely high temperature, it decomposes into silicon vapor and graphite, but does not melt. As far as we are aware, no bonding agent heretofore has been known in which silicon carbide would dissolve without decomposition. In carrying out the present invention, we have found that silicon carbide dissolves readily in molten boron carbide or fusions of boron carbide with other carbides, and that shaped articles containing high percentages of silicon carbide can be made from these compositions. X-ray diffraction spectra have shown that in completely fused boron carbide-silicon carbide compositions, silicon carbide crystallizes from the melt. The melting point of boron carbide is very close to the decomposition temperature of silicon carbide, and in view of the tendency of silicon carbide to decompose in alloying with metals, it is rather unusal that silicon carbide will dissolve in boron carbide and re-solidify without decomposition. As boron carbide is slightly harder than silicon carbide, hardness of the resulting composition is increased rather than decreased by the presence of the boron carbide bond or matrix.

We have further found that molten boron carbide will also dissolve tungsten carbide, tantalum carbide, vanadium carbide, molybdenum carbide, titanium carbide and other hard carbides of this general nature, which may be classified as the group of carbides having a hardness greater than 9 on the Mohs scale of hardness. All of these carbides are high melting and in general have similar physical and chemical properties. It is thus possible to form mixtures of these difficultly fusible materials with powdered boron carbide or a previously fused mixture or "alloy" of boron carbide and one or more other carbides, and to obtain compositions which are plastic or partly liquid and partly solid over a wide range of temperatures. These mixes can be subjected to pressures and molded in accordance with the procedure which will be subsequently described.

In the forming of dense articles from fused alumina by the compression of a plastic mix, a minor proportion of silica, boric oxide, borosilicate glass, or the alumina-silica eutectic containing about 90 per cent silica can be added to the mix. Fused alumina is soluble in these compositions, and the solubility increases with rising temperature, so that the plasticity or "pastiness" of the mix can be readily controlled.

The detailed method of carrying out the invention will be more clearly understood from a consideration of the accompanying drawing.

Figure 1:
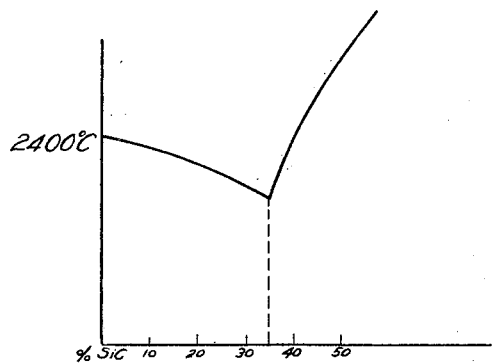
Figure 1 shows an approximate temperature-solubility diagram of silicon carbide in molten boron carbide as determined by our investigations of melting points.

Referring to Figure 1, it must be realized that the determination of solubility diagrams at 2500° C. with materials which both oxidize and readily absorb carbon is only approximate. Our experiments have shown, however, that boron carbide will dissolve silicon carbide up to about 35 per cent silicon carbide with a slight decrease in melting temperature, the minimum melting temperature being about 2200–2300° C. at approximately 35 per cent silicon carbide. After a concentration of 35 per cent silicon carbide is reached, the melting point curve rises abruptly, and if a mixture containing more than approximately 50 per cent silicon carbide is maintained at a temperature of, for example, 2400° C., a portion of the mixture will be molten, but some of the silicon carbide will remain undissolved. With increasing temperature more silicon carbide will dissolve, and this process will continue until the decomposition temperature of silicon carbide into silicon vapor and graphite is reached. By adjusting the composition and temperature so as to render the mix plastic without completely melting or decomposing it, bodies of low porosity which are characterized by a metallic or "silky" fracture can be produced which may have a silicon carbide content of up to about 80 per cent. Articles of this nature are extremely hard and wear resistant, and can be used for dies, bearings, sand blast nozzles, and other similar applications.

In making shaped articles high in silicon carbide from mixes containing boron carbide, we have found it desirable to mix the silicon carbide in powdered form with a powdered pre-fused composition of boron carbide and silicon carbide, and preferably the eutectic composition containing approximately 35 per cent silicon carbide. This pre-fused composition can be made by the process described in our copending application, Serial No. 12,588, filed March 23, 1935. In this process a mixture of silica, anhydrous boric oxide and carbon, in the proportions to give a final product desired, is moistened with kerosene and packed around a solid carbon resistor positioned between two large carbon electrodes. The mixture is then reduced to carbides by passing an electric current through the resistor. For a furnace charge 18 inches long and 18 inches in diameter, and a carbon resistor 2½ inches in diameter, a current of from 80 to 100 kilowatts for from 2 to 3 hours will produce a satisfactory product. The carbide fusion forms a shell or crust which is spaced a considerable distance from the resistor, and this shell can be separated easily from the unfused material and the incompletely converted products. The melted crust is pulverized, and additional silicon carbide added in order to give a mixture having a large temperature interval within which the mix is plastic or "pasty".

In forming the shaped silicon carbide-boron carbide articles, carbon molds are used because of the extremely high temperatures involved. The silicon carbide-boron carbide compositions possess a property which is not characteristic of pure boron carbide, in that they do not dissolve carbon readily from the mold. With pure boron carbide this is a serious difficulty, and special precautions must be taken to limit the temperature and the time of contact with the mold to a minimum. The large temperature interval between the temperature of incipient melting and the temperature of complete melting or the decomposition of the silicon carbide in silicon carbide-boron carbide mixtures also minimizes or eliminates the necessity for critically controlling the temperature, whereas with pure boron carbide, which melts at a constant temperature, the sintered product is ruined when the melting point is exceeded by only a very few degrees.

In the manufacture of shaped silicon boron carbide articles the addition of a small proportion of another carbide such as tungsten carbide, tantalum carbide, or other carbides of the group above mentioned, is often of advantage in minimizing any tendency of the articles to crack during the forming or cooling operations. The amount added can be, for example, from about 5 to 10 per cent. Tungsten carbide has been found especially effective in this connection, and can also be added to other boron carbide compositions for the same purpose.

Shaped articles or massive bodies can also be produced from mixtures of boron carbide and other difficultly fusible carbides such as tungsten carbide, molybdenum carbide, vanadium carbide and tantalum carbide by substantially the same procedure as that outlined for silicon carbide, using either pure boron carbide or a previously fused composition containing boron carbide and one or more of the other carbides as a fusible bond or matrix. These carbide fusions can be prepared either by directly fusing the respective carbides with boron carbide, or by the reduction of the oxides, as outlined in the case of boron carbide-silicon carbide fusions.

Figure 2:
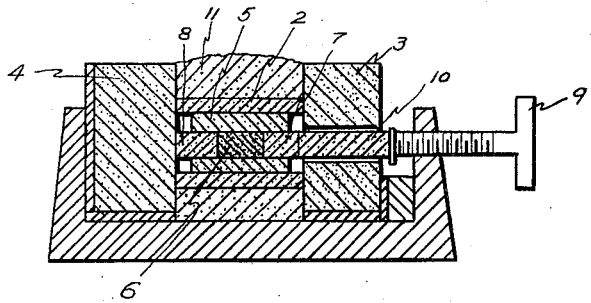
Figure 2 illustrates diagrammatically a carbon tube furnace in which articles of the type herein described can be molded.
Figure 3:
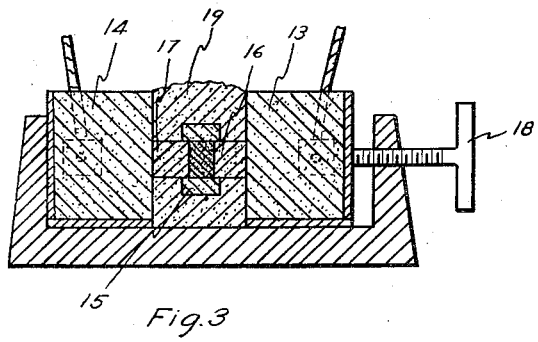
Figure 3 shows diagrammatically a method of heating wherein the current is passed through the mold while the article is being pressed to shape.

Any method suitable for the compression of the mix at high temperatures can be used in consolidating the mix, and the illustrations in Figures 2 and 3 are merely intended as diagrammatic examples. In the method shown in Figure 2, the tube 2 forms the resistor of a carbon tube furnace, the tube being placed between two electrodes 3 and 4. The mold 5 consists of a carbon cylinder and the mix 6 is placed within the cylinder and between the plungers 7 and 8. The electrode 3 is hollow, and pressure is applied to the plunger 7 by the screw jack 9, the pressure being transmitted through the intermediate member 10. The carbon tube is surrounded by granular coke 11.

In the furnace shown in Figure 3, the carbon mold is positioned between the two electrodes 13 and 14. The mix is contained in the carbon ring 15 and pressure applied to it through the plungers 16 and 17 by turning the screw jack 18. The entire mold assembly is covered with powdered coke 19 to prevent oxidation of the mold.

In operating the furnace shown in Figures 2 or 3, the power input and time necessary to produce the required temperature can be determined by trial for any given mix and mold. The temperature of complete consolidation may also be determined by using a stop mold, and breaking the electrical circuit when the plunger comes against the stop. In the latter case the mix should be weighed, and a sufficient quantity introduced so as to produce a substantially solid article when the plunger reaches the stop. When the mix becomes plastic, there is a large contraction in volume as pressure is applied, but when consolidation takes place, no further contraction or compression is produced, so that when this point is reached, no further heat need be applied.

A number of other devices can also be used for the consolidation of the heated mix, such as the continuous application of hydraulic pressure, application of pressure by a weight and lever mechanism, and other similar methods.

It has been found of advantage also to subject the mix to a high forming pressure before heating. Jolting or applying pressure by sudden impact, either during cold pressing or subsequent heating, is also effective in removing trapped air or adsorbed air films between the particles being consolidated.

With the process herein described, articles having a porosity of less than 5 per cent can be readily produced, as compared with from 35 to 40 per cent for the usual bonded articles. In most instances, articles having substantially no porosity can be made, providing the mix and the temperature of heating are such that the plastic or fused portion of the material is of sufficient percentage to completely fill the pores between the unfused particles.

While incipient melting is desirable to obtain plasticity so as to deform the mix at comparatively low pressures, the materials herein described can also be sintered without incipient melting if sufficient pressure is applied during the consolidation process. The powdered materials can be subjected to high pressures when cold, or the pressure can be applied during the heating process. The silicon carbide-boron carbide fusion product, for example, will soften somewhat below the incipient melting point, and can be used as a bonding agent for sintered materials.

Having thus described our invention, we claim:

1. A molded and shaped article in which the principal ingredient is silicon carbide, the said silicon carbide being embedded in a boron carbide matrix.

2. A molded and shaped article consisting essentially of silicon carbide bonded with boron carbide.

3. A molded and shaped article comprising silicon carbide particles embedded in a matrix comprising a boron carbide-silicon carbide fusion product in which silicon carbide has crystallized from molten boron carbide.

4. A molded and shaped article in which the principal ingredient is silicon carbide, said silicon carbide being embedded in a fusion product of silicon carbide and boron carbide.

5. A substantially non-porous, non-metallic, article composed of unmelted particles of one or more carbides of the group of elements consisting of tungsten, molybdenum, titanium, tantalum, vanadium and silicon consolidated and embedded in a matrix consisting of a fusion product of said carbide or carbides and boron carbide, said particles comprising the greater part of said article.

6. A dense, non-metallic, substantially non-porous body composed of unmelted particles of silicon carbide embedded in a matrix comprising a fusion product of silicon carbide and boron carbide, said silicon carbide particles comprising the greater portion of said body.

JOHN A. BOYER.
CARL G. ROSE.